United States Patent [19]

Laubert et al.

[11] 3,997,523
[45] Dec. 14, 1976

[54] MONOAZO PIGMENTS

[75] Inventors: Günter Laubert, Frankfurt am Main; Joachim Ribka, Offenbach (Main), both of Germany

[73] Assignee: Hoechst Aktiengesellschaft, Frankfurt am Main, Germany

[22] Filed: Jan. 22, 1973

[21] Appl. No.: 325,656

[30] Foreign Application Priority Data

Jan. 22, 1972 Germany .................. 2203094

[52] U.S. Cl. .................. 260/203; 260/151
[51] Int. Cl.$^2$ .................. C09B 29/20
[58] Field of Search .................. 260/203, 151

[56] References Cited

UNITED STATES PATENTS

| | | | |
|---|---|---|---|
| 1,522,089 | 1/1925 | Wagner et al. | 260/203 |
| 1,833,567 | 11/1931 | Glietenberg | 260/203 |
| 1,833,568 | 11/1931 | Glietenberg | 260/203 |
| 1,838,270 | 12/1931 | Laska et al. | 260/203 |
| 1,867,439 | 7/1932 | Bonhote | 260/203 |
| 2,006,211 | 6/1935 | Fischer | 260/203 X |
| 2,070,119 | 2/1937 | Fischer | 260/203 |
| 2,478,768 | 8/1949 | Locke | 260/195 X |
| 2,703,319 | 3/1955 | Fischer | 260/203 |
| 3,336,288 | 8/1967 | Stocker et al. | 260/203 |
| 3,342,802 | 9/1967 | Ribka | 260/203 |
| 3,394,123 | 7/1968 | Ronco et al. | 260/203 |
| 3,405,119 | 10/1968 | Stocker et al. | 260/203 |
| 3,509,124 | 4/1970 | Ronco et al. | 260/203 |

OTHER PUBLICATIONS

Georgievics et al., *Dye Chemistry,* Scott, Greenwood & Son; London, 1920, p. 19.

*Primary Examiner*—Charles F. Warren
*Attorney, Agent, or Firm*—Curtis, Morris & Safford

[57] ABSTRACT

Monoazo pigments of the general formula

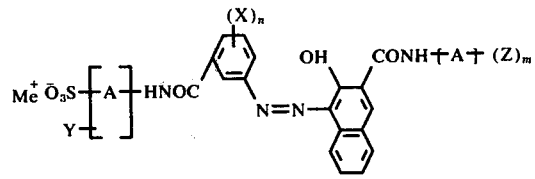

wherein X is hydrogen or halogen, preferably chlorine or bromine, alkyl, alkoxy, trifluoromethyl, phenyl, phenoxy or cyano, Y represents hydrogen or halogen, preferably chlorine or bromine, alkyl, alkoxy, carbomethoxy, phenyl or phenoxy, Z represents hydrogen, chlorine or bromine, alkyl, alkoxy, nitro, cyano, trifluoromethyl, methylsulfonyl, aminocarbonyl, alkylaminocarbonyl, phenylaminocarbonyl, aminosulfonyl, alkylaminosulfonyl, alkanoylamino or aroylamino, A represents a phenyl or naphthalene ring, n represents 1 or 2, m is an integer of from 1 to 3 and Me is an equivalent of a metal cation forming a lake and a process for preparing them by diazotizing aromatic amines of the general formula

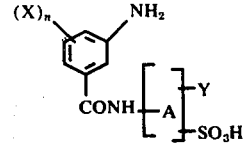

with coupling components of the general formula

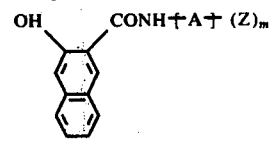

and subsequently converting into a lake with metal salts, X,Y,Z,A, n and m having the above meaning. These pigments can be successfully used for dyeing all materials usually dyed with pigments. They are especially suitable for coloring high molecular plastics such as PVC and on account of their excellent resistance to heat, for coloring polyolefins.

7 Claims, No Drawings

MONOAZO PIGMENTS

The present invention relates to novel monoazo pigments of the general formula

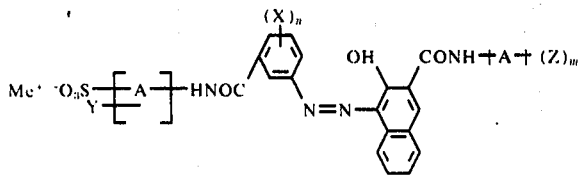

wherein X is hydrogen or halogen, preferably chlorine or bromine, alkyl, alkoxy, trifluoromethyl, phenyl, phenoxy or cyano, Y represents hydrogen or halogen, preferably chlorine or bromine, alkyl, alkoxy, carbomethoxy, phenyl or phenoxy, Z represents hydrogen, chlorine or bromine, alkyl, alkoxy, nitro, cyano, trifluoromethyl, methylsulfonyl, aminocarbonyl, alkylaminocarbonyl, phenylaminocarbonyl, aminosulfonyl, alkylaminosulfonyl, alkanoylamino or aroylamino, A represents a phenyl or naphthalene ring, $n$ represents 1 or 2, $m$ is an integer of from 1 to 3 and Me is an equivalent of a metal cation forming a lake.

The invention further relates to a process for preparing the mentioned monoazo pigments, which comprises diazotizing aromatic amines of the general formula

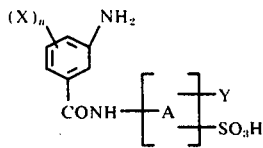

with coupling components of the general formula

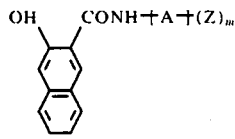

and subsequently converting into a lake with metal salts, X,Y,Z,A, $n$ and $m$ having the above meaning.

The preferred compounds are those of the formula

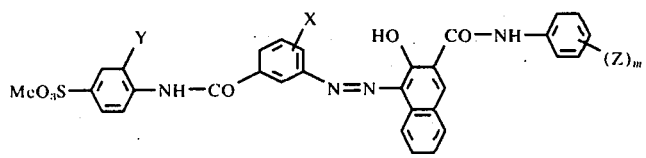

wherein Me is one molar equivalent of calcium, strontium, barium, or manganese, Y is hydrogen, chlorine, lower alkyl or lower alkoxy, X is hydrogen, chlorine, lower alkyl, lower alkoxy, trifluoromethyl, cyano or carbomethoxy, Z represents the same or different substituents selected from the group consisting of chlorine, lower alkyl, lower alkoxy, lower alkanoylamino and benzoylamino and $m$ is 0, 1, 2 or 3. In the foregoing compounds, Y is preferably methyl or methoxy, X is methyl, ethyl, methoxy, ethoxy or carbomethoxy and Z is methyl, methoxy, ethoxy or acetamino.

As aromatic amines of the general formula (2) may be considered N-(3'-aminobenzoyl)-aminonaphthylsulfonic acids or N-(3-aminobenzoyl)-aminophenylsulfonic acids, which are substituted, as indicated above, by substituents having the meaning X or Y. They are obtained by benzoylation of corresponding aminoarylsulfonic acids with 3-aminobenzoic acid chlorides. Preferred compounds are those aromatic amines of the formula (2) which are obtained by benzoylating naphthoic acid or sulfanilic acids of the formula

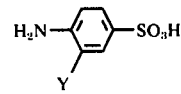

As coupling components are used 2-hydroxynaphthoic acid-3-arylamides, which are substituted in the arylamide ring by one to three of the groups mentioned in the meaning of Z; preferred substituents are hydrogen, chlorine and bromine, alkyl, alkoxy, alkanoylamino and benzoylamino groups. Examples for those 2-hydroxynaphthoic acid-3-arylamides may be found in Colour Index, 3rd edition, volume 4, pages 4356–4360.

The terms alkyl, alkoxy and alkanoyl relate to those groups which contain 1 to 4 carbon atoms, such as methyl, ethyl, propyl, i-propyl or n-butyl or the corresponding alkoxy and alkanoyl groups.

The dyestuffs according to the invention are prepared according to known methods by coupling the diazotized aromatic amines of the formula (2) with the coupling components of the formula (3) in a weakly acidic (acetic acid) to weakly basic (sodium carbonate) medium, preferably in the presence of a non-ionogenic, anionactive or cation active dispersing agent or in the presence of an organic solvent. The coupling reaction may also be carried out in organic solvents.

In some cases the diazonium salts are difficulty soluble in the aqueous medium and are precipitated. They may be isolated and coupled as a moist paste. Diazotizing may also be carried out in a suitable organic medium, for example in acetic acid, alcohol, formamide, dimethyl formamide or dimethyl sulfoxide and the solution thus obtained of the diazonium compound may be combined with the coupling component. The dyestuffs are isolated as usual, stirred to a paste and converted into lakes with suitable metal salts at higher temperatures. As lake-forming metal-salts may be considered the water-soluble salts of the following metals: aluminium, tin, copper, lead, zinc, cadmium, mercury, titanium, zirconium, chromium, manganese, iron, cobalt, nickel and preferably the salts of the alkaline-earth metals. In some cases the alkali metal salts are also suitable as lake forming salts. The conversion into a lake may also be effected directly after coupling without previous isolation of the dyestuff.

Pigments having particularly soft grains are obtained when the coupling or the convertion into a lake are carried out in the presence of dispersion agents, as for example of the condensation product of oleic acid chloride and methylamino acetic acid or 2-methylamino-ethanesulfonic acid, of the ethoxylation product of soybean oil, for example Edenol D81, or in the presence of partial fatty acid esters of the glycerol, for example Loxiol G10. The conversion into a lake may also be performed in the presence of one of the most usual substrates such as aluminium hydroxide or barium sulfate.

The color pigments obtained according to the invention are completely unsoluble in water, the usual organic solvents, in diluted hydrochloric acid and diluted sodium hydroxide solution.

They are suitable for preparing colored lacquers, lake formers, solutions and products of acetyl cellulose, natural resins or synthetic resins, such as polymerisation or condensation resins, such as for example amino- or phenoplasts, as well as of polystyrene, polyolefins, as for example polyethylene or polypropylene, polyacrylic compounds, polyvinyl compounds, as for example polyvinyl chloride or polyvinyl acetate, polyesters, rubber, casein or silicone resins.

The novel pigment dyestuffs are further suitable for the pigment printing on substrates, especially textile fibre materials or other articles having a plane surface, such as paper.

They may also be used for other purposes, for example in a finely divided form for dyeing rayon of viscose or cellulose ethers or esters, polyamides, polyurethanes, polyglycol terephthalates or polyacrylonitrile in the spinning mass or for coloring paper.

The color pigments are characterized by excellent fastness properties, especially by an excellent fastness to migration and to light. Therefore, they are especially suitable for coloring high-molecular plastics such as PVC, and on account of their excellent resistance to temperature, for coloring polyolefins.

In contradistinction to the pigments known from German patent specification No. 1,078,259, which are obtained by coupling diazotized 1-aminobenzene-2-sulfonic acids with 1-(2-hydroxy-3'-naphthoyl)-aminobenzene-4-sulfonic acids and by subsequent metallization with barium salts, the pigments obtained according to the invention are characterized by a much better fastness to light and to temperature, by much more brilliant shades and a much better covering power.

The following Examples illustrate the invention. Parts and percentages are by weight unless stated otherwise. The relationship between "parts by weight" and "parts by volume" is as "grams" to "cubic centimeter".

EXAMPLE 1

21.9 Parts of N-(3-amino-benzoyl)-sulfanilic acid were dissolved in 75 parts by volume of 2N sodium hydroxide solution and 450 parts by volume of water, mixed with 30 parts by volume of 5N sodium nitrite, filtered and added dropwise within 45 minutes at 0° to 10° C into a mixture of 300 parts by volume of water, 105 parts by volume of 5N hydrochloric acid and 0.5 part of the condensation product of one mol of oleyl alcohol and 30 mols of ethylene oxide. Stirring was continued for 4 hours, the temperature being maintained below 10° C by addition of ice. When the excess of nitrous acid had been destroyed by addition of amidosulfonic acid, the pH value was adjusted to 5.5 with 4N sodium acetate.

Furthermore, 24.2 parts of 2-hydroxynaphthoic acid-3-(4'-ethoxy)-anilide were dissolved in 225 parts by volume of water, 150 parts by volume of ethanol and 9 parts by volume of a 39 % sodium hydroxide solution, filtered and added dropwise, during 30 minutes, while stirring vigorously at 15° C, to the diazonium salt suspension. When the coupling was completed, the pH value was adjusted to 7.5, 1.66 parts of the permethylated condensation product of 2 mols of stearic acid and one mol of triethylene-tetramine were added, the whole was heated to 90° C, 45 parts by volume of 1m calcium chloride were poured to the mixture and the whole was stirred for 30 minutes at 90°–95° C. To obtain an optimum color intensity and covering powder the suspension was stirred for 30 minutes at 125° C in the autoclave. After suction-filtering, washing and drying at 65° C, 45.4 parts of a yellowish red color pigment were obtained which had a very good covering power, fastness to light and an excellent fastness to solvents and to migration and an excellent resistance to heat in polyolefins.

The color pigment has the following constitution:

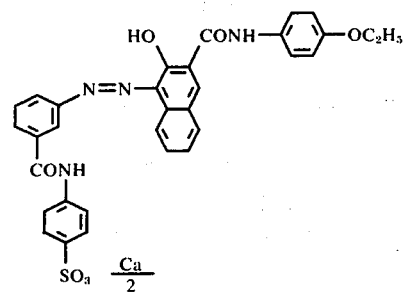

When the laking process was effected with manganese sulfate instead of calcium chloride, a yellowish red color pigment was obtained having also very good properties.

In analogous way the following color pigments were obtained by coupling diazotized N-(3-amino-benzoyl)-sulfanilic acid with (2-hydroxynaphthoic acid-3)-anilides and metallizing with polyvalent metal ions. Column I indicates the corresponding coupling component, column II the metal used for laking and column III the shade of the polyvinyl chloride foil dyed with the corresponding pigment.

| I | II | III |
|---|----|-----|
| 2-Hydroxynaphthoic acid-3-anilide | Ca | orange |
| 2-Hydroxynaphthoic acid-3-(4'-methoxy)-anilide | Ca | scarlet |
| 2-Hydroxynaphthoic acid-3-(4'-methoxy)-anilide | Ba | scarlet |
| 2-Hydroxynaphthoic acid-3-(2'-methoxy)-anilide | Ca | red orange |
| 2-Hydroxynaphthoic acid-3-(2'- | Ca | red orange |

| I | II | III |
|---|---|---|
| methyl)-anilide | | |
| 2-Hydroxynaphthoic acid-3-(2'-methyl)-anilide | Ba | red orange |
| 2-Hydroxynaphthoic acid-3-(2'-ethoxy)-anilide | Ca | scarlet |
| 2-Hydroxynaphthoic acid-3-(2'-ethoxy)-anilide | Mn | scarlet |
| 2-Hydroxynaphthoic acid-3-(2', 4'-dimethoxy-5'-chloro-anilide | Ca | bluish red |
| 2-Hydroxynaphthoic acid-3-(2', 5'-dimethoxy-4'-chloro-anilide | Ca | bluish red |

EXAMPLE 2

16.3 Parts of N-(3-amino-4-chloro-benzoyl)-sulfanilic acid were dissolved in 400 parts by volume of water and 30 parts by volume of 2N sodium hydroxide solution, mixed with 20 parts by volume of a 5N sodium nitrite solution and added dropwise, while stirring, within 2 hours at 10° C into a mixture of 300 parts by volume of water, 60 parts by volume of 5 N hydrochloric acid and 10 parts by volume of a 5 % solution of the condensation product of 1 mol of oleyl alcohol and 30 mols of ethylene oxide. Stirring was continued for one hour at room temperature, the excess of nitrous acid was eliminated, the temperature increased to 10° C by addition of ice, 125 parts by volume of 4N sodium acetate were added and the pH-value was adjusted to 5.5 with 2N soda solution.

Furthermore 15.4 parts of 2-hydroxynaphthoic acid-3-(2'-methoxy)-anilide were dissolved in 150 parts by volume of water, 150 parts by volume of ethanol and 6 parts by volume of a 33 % sodium hydroxide solution, the whole was clarified, and added dropwise during 30 minutes, while stirring well at 15°–20° C to the diazonium salt suspension. When the coupling was completed, the pH value was adjusted to 7.0 with diluted sodium hydroxide solution, the whole was mixed at 90° C with 45 parts by volume of 1m calcium chloride solution, stirred for 30 minutes at 90°–95° C, suction-filtered, washed and dried. The powdered pigment was stirred with 600 parts by volume of dimethyl formamide, heated for 1 hour to 125° C, suction-filtered, washed and dried. 30.6 Parts of a pigment having the following constitution were obtained:

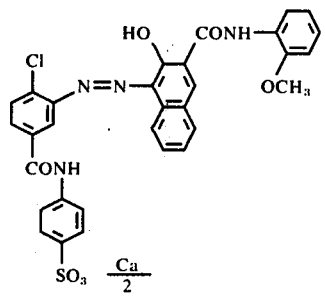

Incorporated into polyvinyl chloride, the color pigment obtained provided scarlet intense dyeings having a very good fastness to solvents, to migration and to light, and due to its high resistance to temperature, it is also suitable for coloring polyolefins and enamels. By coupling with other 2-hydroxynaphthoic acid-3-anilides and laking with polyvalent metal ions from the diazotized N-(3-amino-4-chloro-benzoyl)-sulfanilic acid, the pigments listed in the following Table are obtained in analogous way. The columns I to III have the same meaning as those in the first Table:

| I | II | III |
|---|---|---|
| 2-Hydroxynaphthoic acid 3-anilide | Sr | red orange |
| 2-Hydroxynaphthoic acid 3-(4'-methoxy)-anilide | Ba | yellowish red |
| 2-Hydroxynaphthoic acid 3-(2'-ethoxy)-anilide | Ca | yellowish red |
| 2-Hydroxynaphthoic acid 3-(2'-ethoxy)-anilide | Ba | yellowish red |
| 2-Hydroxynaphthoic acid 3-(4'-ethoxy)-anilide | Ca | yellowish red |
| 2-Hydroxynaphthoic acid 3-(2',-4'-dimethoxy-5'-chloro-anilide | Ca | bluish red |
| 2-Hydroxynaphthoic acid 3-(2',-5'-dimethoxy-4'-chloro-anilide | Ca | bluish red |
| 2-Hydroxynaphthoic acid 3-(1'-naphthyl)-amide | Ca | bluish red |
| 2-Hydroxynaphthoic acid 3-(2'-naphthyl)-amide | Ca | bluish red |

EXAMPLE 3

16.1 Parts of N-(3-amino-4-methoxy-benzoyl)-sulfanilic acid were diazotized according to Example 2 and at 10° C, the pH value was adjusted to 5.5 with 2N soda solution. Furthermore, 18.75 parts of 2-hydroxynaphthoic acid-3-(2',4'-dimethoxy-5'-chloro)-anilide were dissolved in 6 parts by volume of a 33 % sodium hydroxide solution, 150 parts by volume of water and 100 parts by volume of ethanol, the whole was clarified and added dropwise during 30 minutes at 10° C to the diazonium salt suspension. When the coupling was completed, the pH value was adjusted to 9° and at 90° C, 16.5 parts of calcium chloride dissolved in 100 parts by volume of water were added; stirring was continued for 30 minutes at 90°–95° C, the whole was suction-filtered, washed, the moist press-cake was mixed with 700 parts by volume of dimethyl formamide and stirred for one hour in the boiling heat. The pink color pigment thus obtained (33.4 parts) having the following constitution

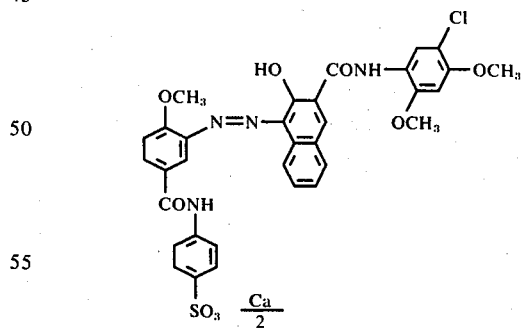

had an excellent fastness to solvents, to migration and to light. The dyeings of polyvinyl chloride or polyolefins prepared with the pigment had a high tinctorial strength and an excellent brilliance.

By coupling with further 2-hydroxynaphthoic acid-3-arylamides and laking with soluble polyvalent metal salts, the following novel azo pigments were obtained from the diazotized N-(3-amino-4-methoxy-benzoyl)-sulfanilic acid:

| I | II | III |
|---|---|---|
| 2-Hydroxynaphthoic acid 3-anilide | Ca | pink |
| 2-Hydroxynaphthoic acid 3-anilide | Ba | pink |
| 2-Hydroxynaphthoic acid 3-(2'-methyl)-anilide | Ca | bluish red |
| 2-Hydroxynaphthoic acid 3-(4'-methyl)-anilide | Ca | bluish red |
| 2-Hydroxynaphthoic acid 3-(2'-methoxy)-anilide | Ca | carmine |
| 2-Hydroxynaphthoic acid 3-(2'-methoxy)-anilide | Ba | carmine |
| 2-Hydroxynaphthoic acid 3-(4'-methoxy)-anilide | Ca | carmine |
| 2-Hydroxynaphthoic acid 3-(2',5'-dimethoxy-4'-chloro)-anilide | Ca | bluish red |
| 2-Hydroxynaphthoic acid 3-(2'-ethoxy)-anilide | Ca | maroon |
| 2-Hydroxynaphthoic acid 3-(4'-ethoxy)-anilide | Ca | carmine |
| 2-Hydroxynaphthoic acid 3-(4'-chloro)-anilide | Sr | carmine |
| 2-Hydroxynaphthoic acid 3-(4'-benzoylamino)-anilide | Ca | bluish red |
| 2-Hydroxynaphthoic acid 3-(1'-naphthyl)-amide | Ca | bluish red |
| 2-Hydroxynaphthoic acid 3-(2'-naphthyl)-amide | Sr | carmine |
| 2-Hydroxynaphthoic acid 3-(2'-naphthyl)-amide | Ba | carmine |

EXAMPLE 4

61.2 Parts of N-(3-amino-4-methyl-benzoyl)-sulfanilic acid were dissolved in 1200 parts by volume of water and 150 parts by volume of 2N sodium hydroxide solution at 50° C, 44 parts by volume of 5N sodium nitrite solution were added and this solution was introduced dropwise within 2 hours while stirring at 30° C into a mixture of 120 parts by volume of 5N hydrochloric acid, 100 parts by volume of water and 5 parts by volume of a 10 % aqueous solution of the condensation product of 1 mol of oleyl alcohol and 30 mols of ethylene oxide. Stirring was continued for 45 minutes, the nitrous acid in excess was destroyed with amidosulfonic acid and this suspension was added dropwise, while stirring within 1 hour, to a solution cooled to 10° C of 60.3 parts of 2-hydroxynaphthoic acid-3-(4'-methoxy)-anilide in 200 parts by volume of 2N sodium hydroxide solution, 100 parts by volume of 2N soda and 5 parts by volume of a 10 % aqueous solution of the condensation product of 1 mol of oleyl alcohol and 30 mols of ethylene oxide. When the coupling was completed, the pH value was adjusted to 7.0 with 5N hydrochloric acid, 2 parts of the condensation product of oleic acid chloride and methylamino acetic acid were added, the whole was heated to 80° C, 8 parts of Loxiol G10 were added, heating was continued to 90° C and 150 parts by volume of a 1 m calcium chloride solution were added while stirring within one hour; the temperature was maintained for 10 minutes, the mixture was suction-filtered hot and washed with water. The moist press-cake was again stirred to a paste with 2000 parts by volume of water, 2.5 parts by volume of 2N sodium hydroxide solution, 50 parts by volume of 2N sodium hydroxide solution, 50 parts by volume of 2N calcium chloride and 8 parts of Loxiol G 10 were added and heated for 1 hour to 125° C.

The brilliant yellowish red color pigment was suction-filtered, washed with water and dried. 140 Parts of a pigment having the following structure was obtained:

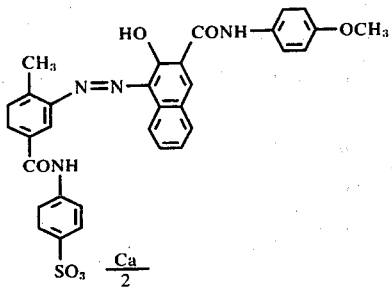

When incorporated into polyvinyl chloride, polyethylene, polystyrene and other plastics, the pigment provided intense yellowish red dyeings of an excellent fastness to light, water, acid, alkalis and to migration, an excellent resistance to temperature, an excellent brilliance and a very good covering power.

With other metal salts further valuable color pigments can be obtained for example from the sodium lake by remetallization in an aqueous suspension. The following compounds may be mentioned:

$Be^{2+}$—, $Sr^{2+}$—, $Ba^{2+}$—, $Al^{3+}$—, $Sn^{2+}$—, $Pb^{2+}$—, $Cu^{2+}$—, $Zn^{2+}$—, $Cd^{2+}$—, $Hg^{2+}$—, $Ti^{4+}$—, $Zr^{4+}$—, $Cr^{3+}$—, $Mn^{2+}$—, $Fe^{2+}$—, $Fe^{3+}$—, $Co^{2+}$—, $Ni^{2+}$— and $Pd^{2+}$ lakes.

EXAMPLE 5

While stirring, a suspension of 16.95 parts of fresly precipitated barium sulfate in 700 parts by volume of hot water and subsequently 100 parts by volume of 1m barium chloride were added within 30 minutes to the coupling suspension of 30.6 parts of diazotized N-(3-amino-4-methylbenzoyl)-sulfanilic acid and 30.8 parts of 2-hydroxyhaphthoic acid-3-(4'-methoxy)-anilide at pH 8.0 and 90° C; stirring was continued for 30 minutes at 90°–95° C, the whole was suction-filtered, washed and dried. 89.1 parts of the brilliant red barium lake with very good fastness properties were obtained.

Further pigments extremely valuable were obtained with other coupling components from N-(3-amino-4-methyl-benzoyl)-sulfanilic acid.

| I | II | III |
|---|---|---|
| 2-Hydroxynaphthoic acid 3-anilide | Ca | middle red |
| 2-Hydroxynaphthoic acid 3-(2'-methoxy)-anilide | Ca | middle red |
| 2-Hydroxynaphthoic acid 3-(2'-methoxy)-anilide | Ba | middle red |
| 2-Hydroxynaphthoic acid 3-(2'-ethoxy)-anilide | Ca | middle red |
| 2-Hydroxynaphthoic acid 3-(2'-ethoxy)-anilide | Ba | middle red |
| 2-Hydroxynaphthoic acid 3-(4'-ethoxy)-anilide | Ca | yellowish red |
| 2-Hydroxynaphthoic acid 3-(4'-ethoxy)-anilide | Ba | yellowish red |
| 2-Hydroxynaphthoic acid 3-(2'-methyl)-anilide | Ca | middle red |
| 2-Hydroxynaphthoic acid 3-(4'-methyl)-anilide | Ca | middle red |
| 2-Hydroxynaphthoic acid 3-(2'-chloro)-anilide | Ca | middle red |
| 2-Hydroxynaphthoic acid 3-(4'-chloro)-anilide | Ca | middle red |
| 2-Hydroxynaphthoic acid 3-(2',4'-dimethoxy-5'-chloro)-anilide | Ca | bluish red |
| 2-Hydroxynaphthoic acid 3-(2',4'-dimethoxy-5'-chloro)-anilide | Ba | bluish red |
| 2-Hydroxynaphthoic acid 3-(2'-5'-dimethoxy-4'-chloro)-anilide | Ca | bluish red |
| 2-Hydroxynaphthoic acid 3-(2',5'-dimethoxy-4'-chloro)-anilide | Mn | bluish red |
| 2-Hydroxynaphthoic acid 3-(4'- | Ca | carmine |

-continued

| I | II | III |
|---|---|---|
| benzoylamino)-anilide | | |
| 2-Hydroxynaphthoic acid 3-(4'-acetylamino)-anilide | Ca | carmine |
| 2-Hydroxynaphthoic acid 3-(1'-naphthyl)-amide | Ca | bluish red |
| 2-Hydroxynaphthoic acid 3-(2'-naphthyl)-amide | Ca | bluish red |

EXAMPLE 6

16.3 Parts of N-(3-amino-6-chloro-benzoyl)-sulfanilic acid were diazotized according to Example 5, coupled with 15.4 parts of 2-hydroxynaphthoic acid-3-(4'-methoxy)-anilide, laked in the presence of 0.5 part of the condensation product of oleic acid chloride and methylamino acetic acid and 2 parts of Loxiol G 10 and 27.5 parts by volume of 1 n calcium chloride, the crude pigment was suction-filtered, stirred again to a paste, and to obtain the full color intensity treated as in Example 5.

34.0 Parts of a yellowish red lacquer having very good fastness properties of the formula

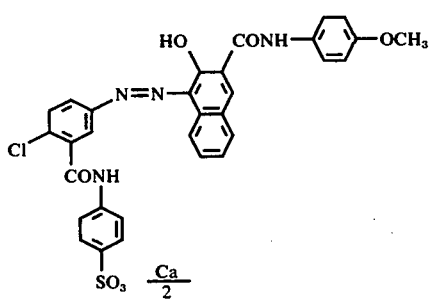

were obtained.

EXAMPLE 7

34 Parts of N-(3'-amino-4'-methyl-benzoyl)-2-chloro-aniline-4-sulfonic acid were diazotized as in Example 5, coupled with 30.8 parts of 2-hydroxynaphthoic acid-3-(4'-methoxy)-anilide and laked with calcium chloride. To obtain the full color intensity, the yellowish red color pigment was heated for 1 hour, while stirring, with dimethyl formamide to 100° C. The pigment having the formula

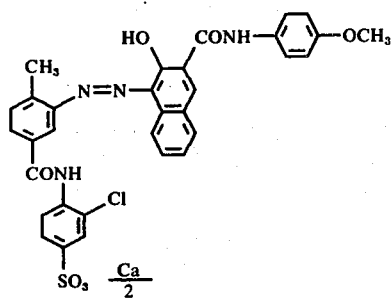

had excellent fastness properties and an excellent brilliance. Corresponding pigments were obtained when N-(3'-Amino-benzoyl)-2-chloro-aniline-4-sulfonic acid,
N-(3'-Amino-4'-chloro-benzoyl)-2-chloro-aniline-4-sulfonic acid,
N-(3'-Amino-6'-chloro-benzoyl)-2-chloro-aniline-4-sulfonic acid,
N-(3'-Amino-4'-methoxy-benzoyl)-2-chloro-aniline-4-sulfonic acid,
N-(3'-Amino-benzoyl)-2-methoxy-aniline-4-sulfonic acid,
N-(3'-Amino-5'-trifluoro-benzoyl)-aniline-4-sulfonic acid,
N'-(3'-Amino-4'-cyano-benzoyl)-aniline-4-sulfonic acid,
N'-(3'-Amino-4'-carbomethoxy)-aniline-4-sulfonic acid,
N-(3'-Amino-4'-ethoxy-benzoyl)-2-chloro-aniline-4-sulfonic acid,
N-(3'-Amino-4'-ethylbenzoyl)-2-chloro-aniline-4-sulfonic acid,
N-(3'-Amino-4'-chloro-benzoyl)-2-methoxy-aniline-4-sulfonic acid,
N-(3'-Amino-6'-chloro-benzoyl)-2-methoxy-aniline-4-sulfonic acid,
N-(3'-Amino-4'-methyl-benzoyl)-2-methoxy-aniline-4-sulfonic acid,
N-(3'-Amino-4'-methoxy-benzoyl)-2-methoxy-aniline-4-sulfonic acid,
N-(3'-Amino-benzoyl)-2-methylaniline-sulfonic acid,
N-(3'-Amino-4'-chloro-benzoyl)-2-methyl-aniline-4-sulfonic acid,
N-(3'-Amino-6'-chloro-benzoyl)-2-methyl-aniline-4-sulfonic acid,
N-(3'-Amino-4'-methyl-benzoyl)-2-methyl-aniline-4-sulfonic acid,
N-(3'-Amino-4'-methoxy-benzoyl)-2-methyl-aniline-4-sulfonic acid was coupled with 2-Hydroxynaphthoic acid - 3-arylamides such as 2-Hydroxynaphthoic acid 3-anilide,
2-Hydroxynaphthoic acid 3-(2'-methoxy)-anilide,
2-Hydroxynaphthoic acid 3-(4'-methoxy)-anilide,
2-Hydroxynaphthoic acid 3-(2'-ethoxy)-anilide,
2-Hydroxynaphthoic acid 3-(4'-ethoxy)-anilide,
2-Hydroxynaphthoic acid 3-(2'-methyl)-anilide,
2-Hydroxynaphthoic acid 3-(4'-methyl)-anilide,
2-Hydroxynaphthoic acid 3-(2'-chloro)-anilide,
2-Hydroxynaphthoic acid 3-(4'-chloro)-anilide,
2-Hydroxynaphthoic acid 3-(4'-benzoylamino)-anilide,
2-Hydroxynaphthoic acid 3-(4'-acetylamino)-anilide,
2-Hydroxynaphthoic acid 3-(2',4'-dimethoxy-5'-chloro)-anilide,
2-Hydroxynaphthoic acid 3-(2',5'-dimethoxy-4'-chloro)-anilide,
2-Hydroxynaphthoic acid 3-(1'-naphthyl)-amide,
2-Hydroxynaphthoic acid 3-(2'-naphthyl)-amide, and the color salts were reacted with polyvalent metal salts such as $CaCl_2$, $SrCl_2$, $BaCl_2$, $MnSO_4$ et al. to give unsoluble lakes.

EXAMPLE 8

17.8 Parts of N-(3'-amino-4'-methyl-benzoyl)-naphthionic acid were diazotized according to Example 5, coupled with 16.2 parts of 2-hydroxynaphthoic acid-3-(2'-ethoxy)-anilide and converted into a lake with calcium chloride. To increase the covering power and color intensity the pigment was heated for 1 hour to 120° C with 700 parts by volume of dimethyl formamide. A red color pigment was obtained (32.5 parts) having excellent fastnesses of the following structure:

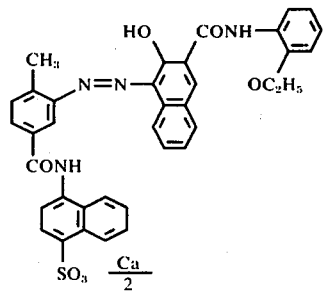

The following pigments were obtained by coupling diazotized N-(3'-amino-4'-methyl-benzoyl)-naphthionic acid with the (2'-hydroxynaphthoic acid-3)-arylides mentioned below:

| I | II | III |
| --- | --- | --- |
| 2-Hydroxynaphthoic acid 3-anilide | Ca | middle red |
| 2-Hydroxynaphthoic acid 3-anilide | Ba | middle red |
| 2-Hydroxynaphthoic acid 3-(2'-methoxy)-anilide | Ca | middle red |
| 2-Hydroxynaphthoic acid 3-(4'-methoxy)-anilide | Ca | middle red |
| 2-Hydroxynaphthoic acid 3-(4'-methoxy)-anilide | Mn | middle red |
| 2-Hydroxynaphthoic acid 3-(4'-ethoxy)-anilide | Ca | middle red |
| 2-Hydroxynaphthoic acid 3-(4'-ethoxy)-anilide | Ba | middle red |
| 2-Hydroxynaphthoic acid 3-(2'-methyl)-anilide | Ca | middle red |
| 2-Hydroxynaphthoic acid 3-(4'-methyl)-anilide | Ca | middle red |
| 2-Hydroxynaphthoic acid 3-(2'-chloro)-anilide | Ca | yellowish red |
| 2-Hydroxynaphthoic acid 3-(4'-chloro)-anilide | Ca | yellowish red |
| 2-Hydroxynaphthoic acid 3-(2',4'-dimethoxy-5'-chloro)-anilide | Ca | bluish red |
| 2-Hydroxynaphthoic acid 3-(2',4'-dimethoxy-5'-chloro)-anilide | Sr | bluish red |
| 2-Hydroynaphthoic acid 3-(2',5'-dimethoxy-4'-chloro)-anilide | Ca | carmine |
| 2-Hydroxynaphthoic acid 3-(2',5'-dimethoxy-4'-chloro)-anilide | Ba | carmine |
| 2-Hydroxynaphthoic acid 3-(1'-naphthyl)-amide | Ca | carmine |
| 2-Hydroxynaphthoic acid 3-(2'-naphthyl)-amide | Ca | carmine |

Instead of N-(3-amino-4-methyl-benzoyl)-naphthionic acid the following N-(aminobenzoyl)-naphthionic acids may be used:

N-(3'-Amino-benzoyl)-naphthionic acid
N-(3'-Amino-4'-chlorobenzoyl)-naphthionic acid
N-(3'-Amino-6'-chloro-benzoyl)-naphthionic acid
N-(3'-Amino-4'-methoxy-benzoyl)-naphthionic acid

We claim:
1. A compound of the formula

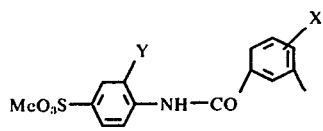

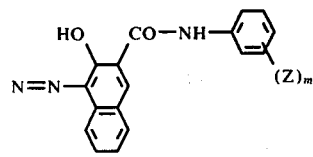

wherein Me is one molar equivalent of calcium, strontium, barium or manganese; Y is hydrogen, chlorine, lower alkyl or lower alkoxy,
X is hydrogen, chlorine, lower alkyl, lower alkoxy, trifluoromethyl, cyano or carbomethoxy,
Z represents the same or different substituents selected from the group consisting of chlorine, lower alkyl, lower alkoxy, lower alkanoylamino and benzoylamino and $m$ is 1, 2 or 3.

2. A compound of the formula recited in claim 1, wherein Y is methyl or methoxy, X is methyl, ethyl, methoxy, ethoxy or carbomethoxy and Z is 0, methyl, methoxy, ethoxy or acetamino.

3. A monoazo pigment of the formula

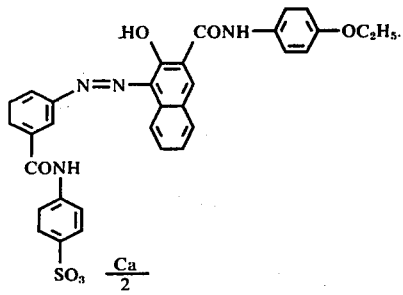

4. A monoazo pigment of the formula

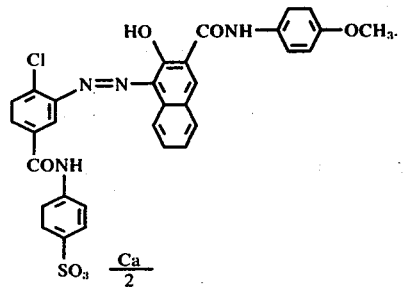

5. A monoazo pigment of the formula

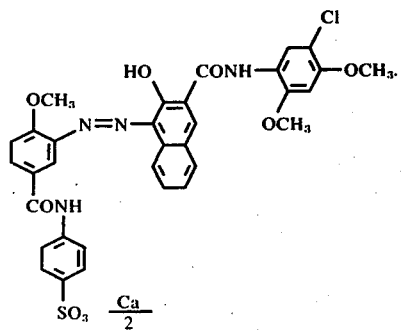

6. A monoazo pigment of the formula
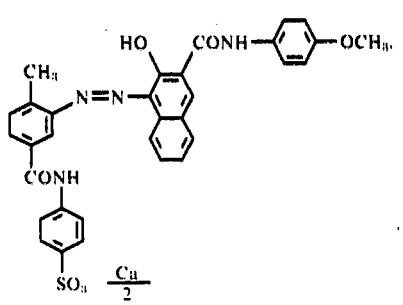
7. A monoazo pigment of the formula
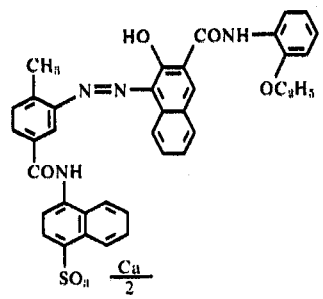
* * * * *